United States Patent [19]

Flannelly

[11] 4,031,744

[45] June 28, 1977

[54] METHOD AND APPARATUS FOR ANALYZING A DAMPED STRUCTURAL SPECIMEN

[75] Inventor: William G. Flannelly, South Windsor, Conn.

[73] Assignee: Kaman Aerospace Corporation, Bloomfield, Conn.

[22] Filed: Apr. 25, 1975

[21] Appl. No.: 571,636

[52] U.S. Cl. .................................. 73/67.2; 73/71.7
[51] Int. Cl.² ........................................ G01N 29/00
[58] Field of Search .................. 73/67.2, 71.7, 67.1

[56] References Cited

UNITED STATES PATENTS

| | | | |
|---|---|---|---|
| 3,620,069 | 11/1971 | Cole, Jr. ............................. | 73/67.2 |
| 3,758,758 | 9/1973 | Games et al. .................... | 73/67.2 X |

FOREIGN PATENTS OR APPLICATIONS

| | | | |
|---|---|---|---|
| 249,716 | 12/1969 | U.S.S.R. .............................. | 73/67.2 |

*Primary Examiner*—Jerry W. Myracle

*Attorney, Agent, or Firm*—McCormick, Paulding & Huber

[57] ABSTRACT

A method and apparatus for analyzing a damped structural specimen permits undamped mobility values and modal accelerations to be determined. The specimen is excited by vibrations in conventional fashion, and both actual and modified mobility response curves or characteristics are determined from measured responses. The modified mobility curve is produced by adding to a signal representing the vibratory force applied to the specimen an artificial force signal generated electronically. The generated artificial force signal simulates the addition or subtraction of mass at the point on the specimen where responses are measured. An undamped mobility value of the damped specimen is determinable at resonant frequencies indicated by the modified mobility curve. From the undamped mobility value and the corresponding frequencies, it is possible to determine modal accelerations for the various vibratory modes of the specimen.

34 Claims, 3 Drawing Figures

METHOD AND APPARATUS FOR ANALYZING A DAMPED STRUCTURAL SPECIMEN

BACKGROUND OF THE INVENTION

The present invention relates to a method and apparatus for analyzing a damped structural specimen to determine with certainty significant parameters defining the characteristics of the specimen. More particularly, the present invention relates to method and apparatus for determining undamped mobility values and modal accelerations of the damped specimen, such as an airframe, for further use in identifying and improving the dynamic characteristics of the specimen.

Structural dynamic testing carried out in the early developmental stages of a new aircraft is one of the most expensive and time consuming tasks that confronts design engineers. Engineers must obtain directly from test data on an actual or scale model of the aircraft the information needed to predict performance characteristics and eliminate many dynamic problems that cannot be anticipated before the new aircraft is completely reduced to its first physical form. Obtaining meaningful information regarding the significant characteristics of an aircraft and reducing such information is known as system identification. System identification is used to confirm theoretical analysis of the aircraft characteristics and serves to assist the engineer in decision-making processes leading to an improved and more reliable product.

Methods of testing and test data analysis for improving the reliability and performance of aircraft are needed by both industry, and governmental agencies, and the more accurate the analysis and identification of significant parameters of the aircraft system, the greater will be the success in achieving improved reliability and performance. The most common dynamic test carried out on new airframes is a vibration or shake test in which vibratory forces are applied to significant points of the airframe, for example, the mounting points for the lifting rotor of a helicopter, and measurements are taken at the same and other significant points in areas such as the cockpit, engine compartments, the autopilot compartment and the empennage to determine the impedance and transmissability characteristics of the airframe. The most common parameter measured at any point on the airframe is acceleration since this parameter is closely associated with forces, and accelerometers are readily available instruments.

IMPEDANCE AND MOBILITY

Two principal and interrelated response characteristics utilized by engineers in system identification are known as mobility and impedance. System impedance, designated Z, may be defined as a general expression for the combined effect of mass M, damping $g$ and stiffness K characteristics of a structure and interrelates the forces $f$ applied to a specimen or structure at various frequencies $\omega$ with the physical responses $y$. In matrix form:

$$[Z]\{y\} \equiv [K - \omega^2 M + igK]\{y\} = \{f\} \quad (1)$$

also known as the "equations of motion" of the structure under steady state vibration. Mobility Y as used throughout this specification also interrelates the forces applied to a specimen and the physical responses but is the inverse of system impedance as indicated in the expression:

$$\{y\} = [Z]^{-1}\{f\} \equiv [Y]\{f\} \quad (2)$$

In terms of an acceleration response $y$, $$\{\ddot{y}\} = [\ddot{Z}]^{-1}\{f\} \equiv [\ddot{Y}]\{f\} \quad (3)$$

The double dot symbol ($\cdot\cdot$) over the Z and Y designates an acceleration impedance and an acceleration mobility respectively and hence does not mean the second derivative of the parameters Z and Y as is the case with the response parameter $\ddot{y}$ which, in its fundamental form, is a displacement.

Consistent with common usage in dynamics engineering, the term "point" in the following discussion is defined mathematically by the more rigorous term "generalized coordinate" with which analytical dynamicists are familiar.

The expressions given above are illustrated in matrix form since generalized impedance and mobility are properly comprised of many point-pair impedances and mobilities respectively. More particularly, an acceleration mobility is the partial derivative of acceleration with respect to force. For intance, the acceleration at a given point $j$ is given in the expanded rather than matrix form as:

$$\frac{\delta \ddot{y}_j}{\delta f_1} f_1 + \ldots + \frac{\delta \ddot{y}_j}{\delta f_n} f_n = \ddot{y}_j \quad (4)$$

or in terms of mobilities:

$$\ddot{Y}_{j1}f_1 + \ddot{Y}_{j2}f_2 + \ddot{Y}_{j3}f_3 + \ldots + \ddot{Y}_{jn}f_n = \ddot{Y}_j \quad (5)$$

From Equation 5:

$$\ddot{Y}_{jk} \equiv \gamma \ddot{y}_j / \gamma f_k \quad (6)$$

In other words, mobility reduces to the simple ratio of acceleration to force when there is only one external force applied to the specimen. It is possible to determine the entire characteristics of the specimen from single-point shake testing, and therefore, the mobility discussed throughout the remainder of this specification will be the mobility $\ddot{Y}_{jk}$ of Equation 6 unless otherwise indicated.

It will be noted that $\ddot{Y}_{jk}$ is a readily measurable quantity since it is possible to apply only a single vibratory force to a specimen at point $k$ and to measure the response at point $j$ with an accelerometer or other measuring instrument. On the other hand, a single element of the impedance matrix Z of Equation 1 which also relates specimen response with a force is an abstraction because the partial derivatives which the impedance elements represent cannot be individually measured. While it is possible to apply only one force to a continuous specimen, it is impossible to reduce to zero the response to the force at all points other than that for which the impedance element is to be determined. Therefore, the individual contributions of the single impedance elements to the total response at a point $j$ cannot be determined by direct measurement. Engineers performing analysis on a specimen, therefore, deal with mobilities $\ddot{Y}_{jk}$ as part of program determining the structural characteristics of a specimen.

MODAL ACCELERATION

Another significant parameter utilized by engineers in defining and examining the characteristics of a structural specimen is modal acceleration. Like mobilities, a modal acceleration is associated with the response at a given point $j$ produced when the specimen is excited by a force applied at point $k$. There is, however, one modal acceleration for each vibratory mode $i$ of a specimen at a point $j$ when excited by a force at point $k$. Hence, the symbol for a modal acceleration is $A_{jki}$.

A modal acceleration is rigorously defined as follows:

$$A_{jki} = \frac{\phi_{ji}\phi_{ki}}{\phi^T[M]\phi_i} \tag{7}$$

wherein:
- $\{\phi\}_i$ is a normal mode or the eigenvector of the $i$-th mode for $[K]^{-1}[M]$, $[K]$ being the stiffness matrix of the specimen under consideration and $[M]$ being the mass matrix of the specimen,
- $\phi_{ji}$ is the $j$-th element of $\{\phi\}_i$
- $\phi_{ki}$ is the $k$-th element of $\{\phi\}_i$ A modal acceleration has the units of acceleration/force and the denominator on the right-hand side of the Equation 7 is sometimes referred to as the "generalized mass" of the $i$-th normal mode.

Modal accelerations are related to the acceleration mobility of an undamped specimen as follows:

$$\ddot{Y}_{jk} = -\sum_{i=1}^{n} A_{jki} \frac{\omega^2/\Omega_i^2}{1-\omega^2/\Omega_i^2} \tag{8}$$

where:
- $\Omega_i$ is the natural frequency of the $i$-th vibratory mode of the specimen,
- $\omega$ is a forcing frequency at which the specimen is excited, and
- $n$ is the number of vibratory modes exhibited over the range of forcing frequencies of interest.

It will be observed that in a single-degree of freedom system, that is, a system having only one normal mode, the acceleration mobility approaches the modal acceleration at forcing frequencies far above the natural frequency. In a multidegree-of-freedom system, the acceleration mobility at frequencies far above the natural frequencies approaches the sum of the modal accelerations of each mode. Thus, the modal accelerations generally represent factors relating the contribution of each vibratory mode of a specimen the total acceleration mobility.

Utilizing the general expression for acceleration mobility in a system having some structural damping $g$, it can be established that the real portion of the acceleration mobility is given by the Equation:

$$\ddot{Y}_{jk}^R = -\sum_{i=1}^{n} A_{jki} \frac{\omega^2}{\Omega_i^2} \frac{1-\omega^2/\Omega_i^2}{(1-\omega^2/\Omega_i^2)^2 + g_i^2} \tag{9}$$

It will be readily noted that Equation 9 reduces to Equation 8 for a system having no structural damping.

RIGID BODY ACCELERATION COEFFICIENT

An unrestrained structural specimen has six or fewer "rigid body" degrees of freedom, that is, three translational degrees of freedom and three rotational degrees of freedom, each of which defines one of as many as six vibratory modes of the specimen having a zero natural frequency. From Equation 9, it can be determined that in the steady-state condition, that is, zero forcing frequency $\omega$, the sum of terms for the rigid-body degrees of freedom is a constant equal to the sum of the modal accelerations $A_{jki}$ for each of the modes associated with the rigid-body degrees of freedom. Thus, if there are $n$ degrees of freedom, the real acceleration mobility of Equation 9 can be broken down into two sums, one being constant for the $x$ rigidbody degrees of freedom having natural frequencies of zero, and the other a frequency dependent sum for all other modes. This breakdown is indicated as follows:

$$\ddot{Y}_{jk}^R = \sum_{i=1}^{x} A_{jki} - \sum_{i=x+1}^{n} A_{jki} \frac{\omega^2}{\Omega_i^2} \left( \frac{1-\omega^2/\Omega_i^2}{\left(1-\frac{\omega^2}{\Omega_i^2}\right)^2 + g_i^2} \right) \tag{10}$$

The sum of the modal accelerations for the first $x$ modes indicated in Equation 10 being a constant is identified as the ridig-body acceleration coefficient:

$$E_{jk} \equiv \sum_{i=1}^{x} A_{jki} \tag{11}$$

By definition the coefficient is determined at zero forcing frequency or the steady-state condition and the value of the coefficient can be readily calculated by static analysis for any case in which a force is applied to a structure at a point $k$ and a response is measured at a point $j$. The static analysis merely requires that certain measurable characteristics of the structure be known such as the total mass and moments of inertia. For airframes and most any other structure, the statically significant characteristics are either known or are readily determinable.

UTILITY OF MODAL ACCELERATIONS

Modal accelerations, once determined, are of extreme importance to a design engineer since they enable mobilities of a structure at any given frequency to be determined without actual testing at that frequency, they indicate the weight or significance to be attached to the modes of vibration of the structure at the point of interest and they can be used to significantly reduce the time and costs of testing for system identification. For example, with the aid of modal accelerations, a full mobility matrix can be determined by shaking a specimen at a single point. From the expression:

$$A_{jki} = \frac{A_{jei}A_{kei}}{A_{eei}} \tag{12}$$

it is apparent that the modal accelerations for response points $j$, $k$ and $e$ and a forcing point $e$ enable the acceleration mobility at point $j$ for a forcing point $k$ to be determined. Thus, by shaking a structure at one point $e$, a modal acceleration for a different shaking point $k$ can be determined without shaking at $k$. Furthermore, it will be noted from Equation 12 that the modal accelerations for any given mode $i$ satisfy reciprocity so that:

$$A_{jki} = A_{kji} \tag{13}$$

Thus, is is possible to determine all modal accelerations associated with dynamically significant points of a structure by single-point shake testing.

Further system identification is available from the modal accelerations. The ratios of modal accelerations rigorously determine the elements in the modal eigenvectors, and the reciprocal of a driving point modal acceleration, $A_{kkl}$, is the generalized mass of that mode at that point. An accurate knowledge of modal accelerations and natural frequencies permits static influence coefficients for arbitrary restraints to be obtained, permits maneuver inertial loads to be determined and allows other necessary analysis requiring known physical structural parameters to be accomplished.

Since all of the parameters of Equation 10 other than modal acceleration can be measured or determined from a plotted acceleration mobility curve obtained during shake testing, it would appear that modal accelerations can be determined. In practice, however, a completely accurate determination is rendered virtually impossible due to instrumentation limitations, the huge volume of data that must be taken and the inordinate amount of time that would be associated with gathering and processing such data. For example, the calibration of the accelerometers, the mobility measuring equipment and the recording instruments for plotting mobilities must be highly accurate in order to determine natural frequencies and damping factors from plotted data. The mobility curve itself is significantly affected by the damping factor, and except for structures which have very low damping, the determination of modal accelerations from the curve is not reliable. Therefore, processing the large amount of data required to obtain modal accelerations may not be warranted by the results obtained.

In view of the adverse effects that damping causes, it appears more promising to resort to undamped acceleration mobility for a more accurate calculation of the modal accelerations. By setting the damping factor $g$ to zero in Equation 10 and by substituting the rigid-body acceleration coefficient $E_{jk}$ of Equation 11 into Equation 10, the undamped acceleration mobility is given by the equation:

$$\ddot{Y}_{jk} = E_{jk} - \sum_{i=X+1}^{n} A_{jkl} \frac{\omega^2/\Omega_i^2}{(1 - \omega^2/\omega_i^2)} \quad (14)$$

The rigid-body acceleration coefficient is readily determinable as indicated above. The resonant frequencies $\Omega_i$ for each mode can also be determined with reasonable accuracy from the damped mobility curve. Thus, the modal acelerations $A_{jkl}$ can be determined if an undamped value of acceleration mobility and the associated frequencies can be determined. Of course, the undamped mobility of a damped structure is a hypothetical property which is not directly measurable. Nevertheless, the ability to calculate modal accelerations with great accuracy from an undamped mobility value makes its determination highly desirable.

It is, accordingly, a general object of the present invention to disclose a method and apparatus for determining an undamped acceleration mobility value from a damped structural specimen.

It is also a further and more general object of the present invention to disclose a method and apparatus for rigorously determining the modal accelerations of damped structural specimens from the undamped mobility values.

SUMMARY OF THE INVENTION

The present invention resides in a method and apparatus for determining undamped acceleration mobility values from damped structural specimens in order to rigorously determine modal accelerations.

The method, which the apparatus carries out, comprises exciting the damped specimen with a force to determine its response over a broad range of forcing frequencies of interest. The excitation force and the specimen response are measured and corresponding signals are produced. For example, the specimen may be excited by means of a variable frequency vibrator and the applied force may be measured by a transducer such as a strain gauge or impedance head which produces an electrical output signal variable in time and proportional to the applied force. The response of the specimen may be measured by an accelerometer which produces an electrical, time-varying signal proportional to the acceleration or by other transducers producing signals proportional to velocity or displacement.

A signal representing an artificial force proportional to the response signal and having a constant of proportionality of known value is added to the measured force signal to produce a modified force signal. The measured acceleration signal is then divided by the modified force signal in conventional mobility measuring equipment to plot a modified mobility curve. Resonant frequencies are determined in the modified mobility curve and these frequencies can be shown to be the frequencies corresponding with the value of undamped mobility equal to the reciprocal of the constant of proportionality of selected value. In a similar process, reciprocal of the mobility or the impedance of the specimen, rather than the mobility, is plotted and the undamped value of mobility is determined at antiresonant frequencies in the plot.

Having once established an undamped mobility value of a specimen and corresponding frequencies, the modal accelerations are then determined from Equation 14.

The apparatus which generates the artificial force signal may simply be an amplifier having a variable but calibrated gain. Thus, for example, an acceleration signal measured during the step of exciting produces what is equivalent to an artificial inertial force signal proportional to the measured acceleration, and the constant of proportionality represents an electronically simulated undamped impedance, or more specifically a mass in the case of acceleration, added to the structural specimen at the given point where the response is measured. Since the simulated mass is electronically generated, positive or negative mass representing additions to or subtractions from the structural specimen may be simulated simply by reversing the phase or sign of the amplifier output. In the case of a displacement signal the electronically simulated undamped impedance is equivalent to a stiffness, rather than a mass as with an acceleration signal. It should be noted that a signal proportional to any of acceleration, velocity or damping is readily convertible into a signal proportional to any of the remaining two by conventional methods of integration and differentiation.

The determination of modal accelerations by the disclosed method and apparatus is rigorously accurate since damping has been eliminated from the variables used in the calculations. Furthermore, once the apparatus has been calibrated, the only measurements which enter into the calculations are the resonant frequencies, which can be derived from both the actual and modified mobility curves with reasonable accuracy, and the value of the simulated impedance defined by the artificial force which produces the modified mobility. Accurate measurement of the significant variables is a relatively simple matter and thus the entire process of determining both the undamped mobility value and the full complement of modal accelerations can be carried out with relative ease and in a relatively short period of time. Thus, system identification is rendered more accurate, more rapidly. The apparatus serves as a more efficient tool to augment analytical methods based upon intuitive analysis and to close the engineering loop between the analytical engineering which predicts effects and test engineering which measures effects from the actual hardware.

DESCRIPTION OF THE PREFERRED EMBODIMENTS

Theory

Figure 1:
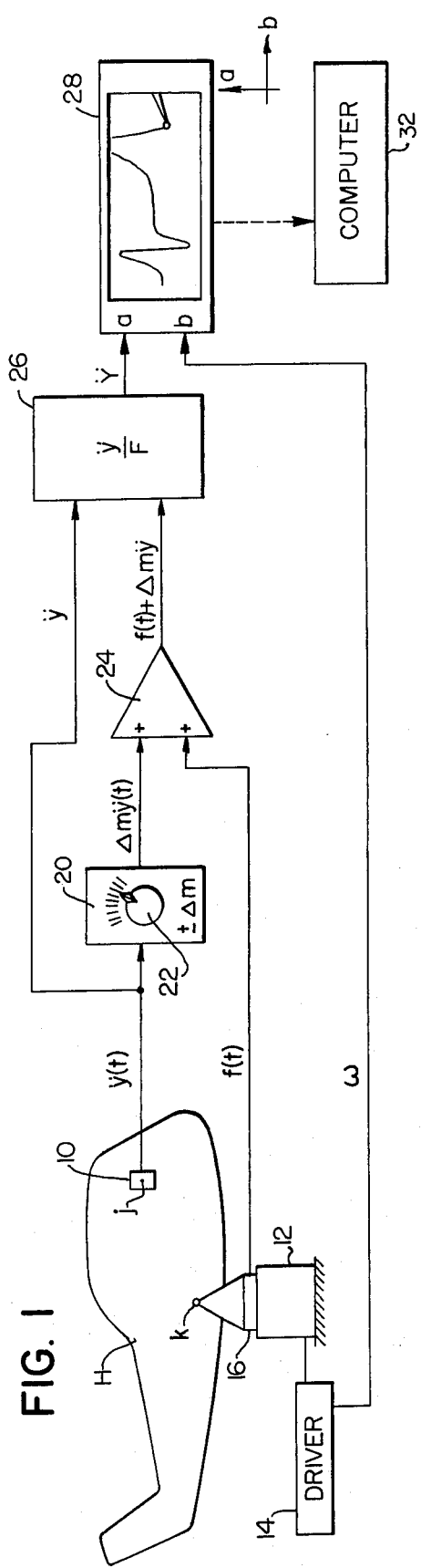
FIG. 1 is a schematic diagram illustrating the method and apparatus of the present invention for determining undamped acceleration mobilities from a damped structural specimen and the corresponding modal accelerations.

If the system impedance Z of a damped structural specimen is changed by adding or subtracting mass or stiffness in some manner, there is a corresponding change in the acceleration mobility of the specimen exhibited during shake testing. If only the jk-th element of the impedance matrix for the specimen is changed by an amount $\Delta Z_{jk}$, the new of modified jk-th acceleration mobility $\ddot{Y}'_{jk}$ is related to the old mobility $\ddot{Y}_{jk}$ by the following equation:

$$\ddot{Y}'_{jk} = \frac{\ddot{Y}_{jk}}{1 + \Delta Z_{jk} \ddot{Y}_{jk}} \quad (15)$$

Except for a driving point mobility, that is, the mobility at the point on the specimen where the exciting force is applied so that points $j$ and $k$ are identical, the changing of only one element of the impedance matrix is physically meaningless because the various elements of the impedance matrix other than driving points are symmetrically and diagonally interrelated with one another. Nevertheless, the addition or subtraction of some impedance factor, for example mass, at a given point in the impedance matrix in accordance with the present invention serves as a valuable aid to the design engineer since it significantly reduces the detrimental effects of damping on the ability to analyze shake test data.

In the following discussion, the change in impedance is, for convenience, selected to be a change in mass since acceleration mobility is to be determined and, as will be made clearer below, mass is the constant of proportionality relating acceleration and force, the two parameters determining such mobility. However, a change in stiffness or other impedance when displacement or other mobilities are involved is also contemplated.

Thus, Equation 15 may be rewritten as:

$$\ddot{Y}'_{jk} = \frac{\ddot{Y}_{jk}}{1 + \Delta m_{jk} \ddot{Y}_{jk}} \quad (16)$$

However, any other impedance characteristic can be selected if desired.

If the natural frequencies of a structure are defined as the frequencies at which the undamped mobility is at resonance or infinite, it will be seen from Equation 16 that the new natural frequencies in the modified mobility occur when the denominator of the right side of the equation is zero or:

$$\ddot{Y}_{jk} = -\frac{1}{\Delta m_{jk}} \quad (17)$$

If $\ddot{Y}'_{jk}$ in Equation 16 is an undamped mobility, $\ddot{Y}_{jk}$ in Equation 16 and 17 must also be an undamped mobility and it will be noted from Equation 17 that the value of $\ddot{Y}_{jk}$ can be determined if the value of $\Delta m$ is known. Thus, a change in impedance or mass of known value when correlated with the resonant frequencies of the modified mobility provides an undamped mobility value for the original or unmodified specimen.

In accordance with the present invention, method and apparatus are disclosed for simulating the addition of a mass $\Delta m_{jk}$ of known value to an element of the impedance matrix for the damped specimen to determine the frequencies at which the undamped mobility $\ddot{Y}_{jk}$ value, equal to the reciprocal of the known value, occurs in the undamped mobility response of the specimen. The undamped mobility value may then be substituted into Equation 14 along with each of its corresponding frequencies and thus permit solution of several simultaneous equations to determine the several modal accelerations $A_{jkt}$.

MOBILITY DETERMINATION

FIG. 1 illustrates schematically the test arrangement and equipment including an impedance or mass synthesizer for determining an undamped mobility value from a damped structural specimen. As illustrated, the damped specimen is a helicopter H since analysis of an airframe structure is a problem confronted in designing every new aircraft. Identification of the airframe or system characteristics must be determined with accuracy from an early version of the aircraft to serve as a basis for further understanding and predictions of performance.

In conventional fashion, the helicopter H is suspended for shake testing in either an unrestrained or partially restrained fashion and accelerometers 10 (only one shown) are attached to the airframe at dynamically significant measuring points $j$. Such points would include for example, the cockpit, the rotor head or transmission mounting points, attachment points for wing tanks, and tail rotor mounting points. The actual points used are not specifically significant to the present invention; however, as in most vibration testing analysis, an intuitive knowledge or experienced judgment of the dynamically significant points of an aircraft will provide the most complete and meaningful test results.

Since the identification of the complete airframe structure (system identification) is desired, the larger the number of test points or accelerometers used, the more complete the results. Of course, the larger the number of test points, the greater the task of taking the actual measurements and processing the accumulated data. So, there are practical considerations which impose some restraint upon the identification process. Since the present invention enables a complete system analysis to be preformed accurately with single-point shaking, that is, by exciting the airframe at a single driving point, and since the invention also minimizes the volume of data that must be processed, a rather complete analysis is possible within practical periods of time.

An exciter or vibrator 12 is connected to the helicopter H at a given driving point $k$, which is also a measuring point $j$, in order to shake the frame with as many degrees of freedom as the restraint system supporting the helicopter allows. A driver 14 connected to the vibrator 12 causes the vibrator to excite the airframe over a broad range of frequencies $\omega$ of interest.

The response of the helicopter H is measured at each of the points $j$ individually by the accelerometers 10 which produce acceleration signals $\ddot{y}$. A force transducer 16 interposed between the vibrator 12 and the driving point $k$ of the helicopter frame measures the exciting force and produces a force signal $f$. Both the acceleration signal and the force signal are sinusoidal manifestations of the measured parameters at the forcing frequency established by the driver 14. By slowly scanning a broad range of forcing frequencies of interest with the driver, for example from zero to 1,200Hertz, substantially all vibrational modes of the frame of interest will be stimulated and measured.

For each point $j$ an impedance synthesizer 20 receives the measured acceleration signal and generates an artificial impedance force proportional to the acceleration. Basically, the synthesizer is a linear amplifier having a control knob 22 for varying gain or amplification factor $\Delta m$ so that the signal generated represents an artificial inertial force having a constant of proportionality $\Delta m$ for any selected setting of the knob 22. Furthermore, the amplifier is provided with a sign or phase reversal switch (not illustrated) for changing the sign or phase of the artificial force signal generated. Thus, the synthesizer 20 produces a force signal representing the inertial force that would be generated by a hypothetical mass added to the helicopter at the measuring point $j$ without actually affecting the true or actual mobility at that point.

A differential amplifier 24 receives both the artificial inertial force signal from the synthesizer 20 and the measured force signal from the transducer 16 and algebraically adds these signals together to produce a resultant or modified force signal F at the output.

Conventional mobility measuring equipment 26 receives both the measured acceleration signal and the signal representing the modified force and determines the acceleration mobility in real time by dividing these signals. The mobility measuring equipment 26 is a conventional mechanical impedance measuring unit, one type, among many, of which is manufactured by, for example, Spectral Dynamics of San Diego, California and another, for example, by Hewlett Packard of Cupertino, California. It will be observed that if the gain of synthesizer 20 is zero, then the output of the equipment 26 is the actual acceleration mobility of the helicopter H for the points $j$ and $k$. Thus, both the actual acceleration mobility and a modified acceleration mobility may be determined over the same range of forcing frequencies by the illustrated equipment.

The determined acceleration mobilities are individually plotted against their corresponding forcing frequencies on an analog recorder 28. Preferably, the plotting operation is performed simultaneously with the measuring of the acceleration and force parameters and the calculation of the mobilities so that real time observation of the mobility plots is possible.

Since the artificial force generated by the synthesizer 20 proportional to the measured acceleration represents a simulated mass attached to the helicopter frame at point $j$, it can be shown that the simulated mass is the same as the change in impedance $\Delta Z$ Equation 15 or the change in mass $\Delta m$ of Equation 16 producing a modified acceleration mobility. Accordingly, the negative of the reciprocable of the value of $\Delta m$ used in determining the modified acceleration mobility is equal to the value of an undamped mobility of the helicopter without the added mass as indicated by Equation 17.

Since the polarity or sign of the artificial force signal generated by the synthesizer 20 can be reversed, the addition of both a positive or a negative mass to the damped helicopter airframe at the response point $j$ may be simulated. It will be understood that the addition of a negative mass is equivalent to removing positive mass from the damped helicopter although in fact no mass is removed. In theory, there is no limit to the value of mass that may be added or subtracted by the synthesizer 20. Therefore, it is possible to simulate the removal of more mass from the response point $j$ than the helicopter frame actually attributes to that point. Whether it is actually desirable to simulate such large quantities of mass change is a matter to be determined by the significance of the results produced in each individual case.

Thus, it is possible to determine an undamped mobility from the reciprocable of the added mass $\Delta m$ of known value. It should be observed that by appropriate calibration of the accelerometer 10, the force transducer 16 and the synthesizer 20, the actual value of $\Delta m$ can be determined directly from the setting of the knob 22. Accordingly, with the system appropriately calibrated, the value of the simulated mass selected by the knob 22 may be read directly from the synthesizer 20, and the undamped mobility may be easily determined from the reciprocal value.

Without knowing the frequency associated with the undamped mobility value, knowledge of the value itself is relatively meaningless. Determination of the associated frequency is made with the aid of the modified mobility plot produced by the recorder 28 as follows.

It will be recalled from the Equation 16 that the undamped, modified acceleration mobility is infinite when the value of the undamped actual or true acceleration mobility is as defined in Equation 17. By definition,, the undamped, modified mobility becomes infinite at resonant frequencies and, therefore, a determination of the resonant frequencies will establish the frequencies at which the undamped true mobility is equal to the reciprocal of the simulated mass $\Delta m$. The resonant frequencies can be determined from the real portion of a damped acceleration mobility curve, that is, the portion of the mobility which is in phase with the driving frequency, with the aid of the equation:

$$\Omega_i^2 = \frac{2p_{1_i}^2}{\frac{p_{1_i}^2}{p_{2_i}^2} + 1} \qquad (18)$$

where $\Omega_i$ is the resonant frequency of the $i$-th mode and $P_{1i}$ and $P_{2i}$ are the peak frequencies of the true damped mobility curve at the $i$-th mode.

The frequencies at which there is a peak in the imaginary acceleration or displacement mobility, or in the real velocity mobility, may also be used as approximations of the resonant frequencies.

Figure 2:
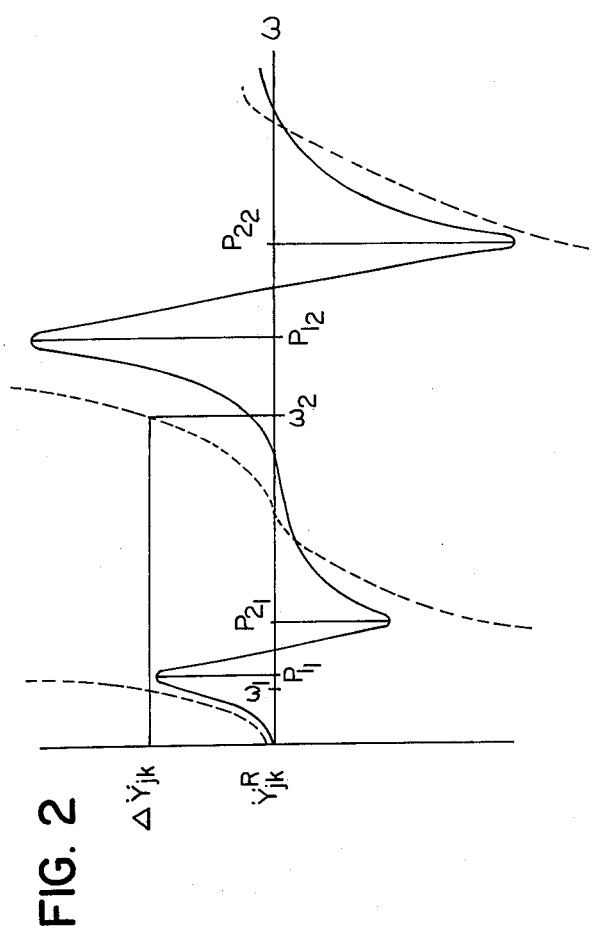
FIG. 2 is a plot of an exemplary acceleration mobility on which an undamped mobility is superimposed.

FIG. 2 illustrates in solid line the real component of a typical acceleration mobility which would be plotted on the recorder 28. For the present purposes, whether the illustrated plot represents the damped modified mobility or the damped true mobility is not material since the calculation of the resonant frequencies from Equation 18 is the same in either case. The peak frequencies for the first mode, $P_{1_1}$ and $P_{2_1}$, are identified. These frequencies may be read directly from the plot and substituted in Equation 18 to calculate the resonant frequency for the first mode.

A second mode having peak frequencies $P_{1_2}$ and $P_{2_2}$ is also illustrated in FIG. 2 and another resonant frequency for the second mode may be calculated from Equation 18 in precisely the same manner. As is frequently found in most complex structures, the mobility curve exhibits many different vibratory modes, some of which have greater significance than others as indicated by the magnitudes of the mobility curve at the peak frequencies associated with the respective modes.

Thus, the vibratory modes illustrated in the plot of FIG. 2 identify specific resonant frequencies. If the plot represents a modified acceleration mobility, then the resonant frequencies determined from Equation 18 are the forcing frequencies which are associated with the undamped acceleration mobility value established by Equation 17 in accordance with the discussion above. In other words, the resonant frequencies are the forcing frequencies which would produce the mobility value of Equation 17 if the helicopter airframe being examined had no damping.

From the above, it will be understood that the value of an undamped acceleration mobility may be obtained from the damped structure with the aid of the synthesizer 20. Although the above discussion related solely to acceleration mobilities, the present invention is applicable to other mobilities such as displacement or velocity mobilities. In the case of a displacement mobility, the constant of proportionality established by the gain of the synthesizer 20 corresponds to a hypothetical change in stiffness at the measuring point $j$ rather than a hypothetical change in mass. Thus, the synthesizer generates an artificial impedance force having a constant of proportionality corresponding to the particular parameter, that is, acceleration or displacement, under consideration and an undamped value of the corresponding mobility is obtained.

It can be shown from Equations 16 and 17 that the resonant frequencies obtained from the modified mobility tend to shift closer to antiresonant frequencies of the specimen. Antiresonant frequencies are defined as the frequencies at which the undamped mobility is zero or, as follows from Equation 3, the frequencies at which the undamped impedance becomes infinite. It is clear from Equation 17 that the larger the gain adjustment $\Delta m$ of the synthesizer 20, the smaller the value of undamped mobility and hence the closer the undamped value is to an antiresonant frequency. Unfortunately, due to the limitations of amplifiers such as those which form the synthesizer 20, it is not possible to adjust the gain upwardly indefinitely in order to determine the values of undamped mobility in the vicinity of antiresonant frequencies.

In order to determine a broader spectrum of undamped mobility values, especially those in the vicinity of an antiresonant frequency, the apparatus of FIG. 1 is utilized to plot modified impedance curves or the reciprocal of mobility on the recorder 28 and from these curves, undamped impedance values with their associated frequencies are obtained. It will be readily understood that having obtained an undamped impedance value, the corresponding undamped mobility value may be obtained from the definition given in Equation 3.

Figure 3:
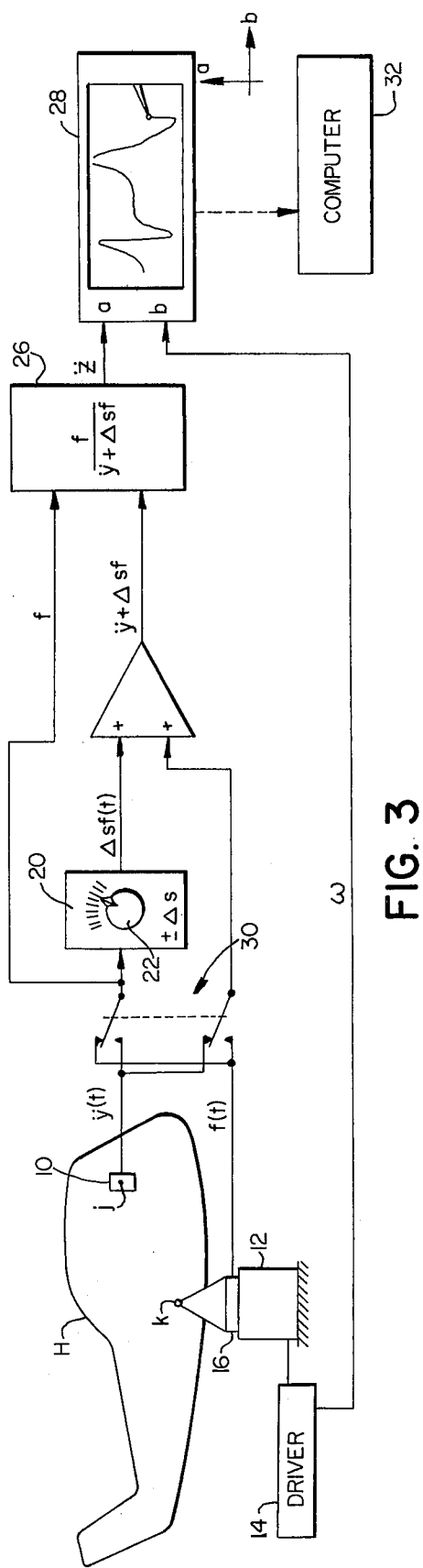
FIG. 3 is a schematic diagram showing the apparatus illustrated in FIG. 1 with the measured parameters processed to obtain undamped mobilities from impedance characteristics.

To this end, FIG. 3 illustrates the apparatus in FIG. 1 to which a parameter reversing switch, generally designated 30, has been added. The switch 30 is connected to the accelerometer 10 and the force transducer 16 to interchange the measured parameter signals processed by the remaining components of the apparatus. Thus, with the contacts of the switch in the upper position illustrated, the acceleration signal is transmitted by the switch to the differential amplifier 24. The time-varying force signal is transmitted directly to the equipment 26 and also is amplified in the synthesizer 20 to produce a modified force signal having a constant of proportionality $\Delta s$ determined by the gain of the synthesizer 20. The value of gain or the constant of proportionality is identified in FIG. 3 by a symbol different from that indicated in FIG. 1 for clarity as will become apparent below.

Within the differential amplifier 24, the modified force signal and the acceleration signal are algebraically added and the resulting signal is divided into the force signal by the equipment 26. If the gain adjustment $\Delta s$ on the synthesizer 20 is zero, it will be understood that the output signal from the equipment 26 represents the true acceleration impedance $\ddot{Z}_{jk}$ of the helicopter at a point $j$ for a force at point $k$. When the gain adjustment $\Delta s$ is other than zero, the output signal from the equipment 26 is a modified impedance $\ddot{Z}_{jk}'$ which has no particular physical significance; however, it can be shown that the relationship between the modified impedance and the true impedance is given by the equation:

$$\ddot{Z}_{jk}' = \frac{\ddot{Z}_{jk}}{1 + \Delta s \ddot{Z}_{jk}} \qquad (19)$$

A curve representing the real or imaginary components of the acceleration impedance obtained from a damped structure such as the helicopter H is similar to the mobility curve illustrated in FIG. 2, that is, the curve possesses nodes and resonant peaks but the peaks of the impedance curve straddle antiresonant frequencies of the undamped impedance curve rather than resonant frequencies. Furthermore, the antiresonant frequencies can be determined from the damped impedance curve by means of Equation 18 in the same manner as the resonant frequencies are obtained from the damped mobility curves.

From the definition of antiresonance given above, it is apparent that the antiresonant frequencies determined from the impedance curve plotted on the recorder 28 occur when the undamped impedance $\ddot{Z}_{jk}'$ is infinite. From Equation 19, it follows that the antiresonant frequencies correspond to true, undamped acceleration impedance values given by the equation:

$$\ddot{Z}_{jk} = \frac{-1}{\Delta s} \tag{20}$$

The corresponding undamped acceleration mobility value is thus determined from Equation 3 to be:

$$\frac{1}{\ddot{Z}_{jk}} \ddot{Y}_{jk} = -\Delta s \tag{21}$$

It will be noted from Equation 19 that with zero gain adjustment on the synthesizer 20, the antiresonant frequencies determined are the true antiresonant frequencies for the helicopter. From Equation 20, it becomes clear that as the gain $\Delta s$ increases, the true impedance value decreases toward zero and thus antiresonant frequencies shift toward the resonant frequencies. Accordingly, although the gain of the synthesizer 20 has a finite upper limit, it is nevertheless possible to determine undamped acceleration mobility values over the full range of frequencies between the true resonant and antiresonant frequencies of the specimen being examined. For frequencies in the vicinity of the true resonant frequencies, the parameter reversing switch 30 is set with the movable contacts in the lower position in FIG. 3 to allow undamped mobility values to be determined from the modified mobility curves as described in connection with FIG. 1. For frequencies in the vicinity of the antiresonant frequencies, the contacts of the switch 30 are set in their upper position to allow undamped impedance and mobility values to be determined from the impedance curves as described in connection with FIG. 3.

MODAL ACCELERATION

Once an undamped value of acceleration mobility has been obtained with its corresponding frequencies, Equation 14 may be utilized to determine the modal accelerations $A_{jki}$ for each mode $i$ since they are the only unknowns in the equation. The rigid-body acceleration coefficient $E_{jk}$ can be calculated from static analysis as described above. The natural frequencies $\Omega_i$ for each mode $i$ can be determined from the actual or true damped acceleration mobility plot with the aid of Equation 18. The actual mobility plot is obtained when the synthesizer 20 is set for zero gain so that there is no artificial force signal added to the actual or true force signal measured by the transducer 16. Thus, each of the parameters other than the modal accelerations in Equation 14 are known or can be determined.

Since there is one modal acceleration for each vibratory mode, each of the modal acceleration represents an unknown and it is, of course, impossible to solve a single equation for multiple unknowns. Since Equation 14 is a linear equation, and since there is one forcing frequency $\omega$ in each mode $i$ corresponding with the undamped value of the acceleration mobility given by Equation 17, it is possible to solve for each of the modal accelerations by setting up a number of simultaneous linear equations, the number of equations being equal to the number of modes and the unknown modal accelerations. Each equation is set up with one of the forcing frequencies and an associated mobility value.

For a clearer understanding of the simultaneous equations, reference is made again to FIG. 2 in which the unknown, undamped acceleration of mobility curve is illustrated in phantom. It will be observed that for an undamped value of acceleration mobility, $\Delta \ddot{Y}_{jk}$ corresponding to the specific $\ddot{Y}_{jk}$ given by Equation 17 there is a forcing frequency $\omega$ for each of the $i$-th modes. For each value of $\Delta \ddot{Y}_{jk}$ and, correspondingly, for each selected setting of the control knob 22 on the synthesizer 20 there will be the same number of forcing frequencies as there are modes in the mobility plots. Thus, a system of simultaneous linear equations equal in number to the modal accelerations may be set up and solved to determine the values of the modal accelerations.

In setting up the system of simultaneous linear equations, it is not necessary that the same value of undamped acceleration mobility be used in each of the equations. Thus, if it is more convenient to utilize different settings of the synthesizer 20 to determine individual equations within the system of simultaneous equations to be solved, such a process is permissible.

Greater accuracy in determining the value of the modal accelerations can also be obtained by eliminating the rigid-body acceleration coefficient $E_{jk}$ from the simultaneous equations solved to obtain the modal accelerations. If two differnt values of undamped mobility and corresponding frequencies are obtained by selecting different values of the mass $\Delta m$, preferably positive and negative values, then two different systems or sets of simultaneous linear equations can be set up. By subtracting at least one of the equations of one set from each of the equations of the other set, a new set of simultaneous equations is obtained from which the rigid-body acceleration coefficient has been eliminated. Thus, it is not essential to determine the value of the coefficient, and any errors associated with a determination of that coefficient do not enter into the calculation of the modal accelerations.

For still greater accuracy, it is preferable to subtract corresponding equations of the two sets obtained by the different mobility values and synthesizer settings. In other words, the equation of the first set having the forcing frequency $\omega_i$ for the first mode plotted with one synthesizer setting should be subtracted from the equation of the second set having the frequency $\omega_i$ of the same mode but with a different synthesizer setting and corresponding mobility. By subtracting corresponding equations from the two sets of simultaneous linear equations, a highly diagonal matrix is set up which is better conditioned for solution than a matrix established with a single set of simultaneous equations quite apart from any inaccuracies in the calculation of the rigid-body acceleration coefficient.

The computations of resonant frequencies, undamped acceleration mobilites and modal accelerations as described above require that certain data be read from the synthesizer 20 and from the plots generated by the recorder 28. Since these computations are repeated for a number of points $j$ on the helicopter or other structural specimen to define the specimen relatively completely, a computer 32 is advantageously employed. The computer is programmed to accept raw data such as the setting of the knob 22 of the synthesizer and the scale marks representing frequency $\omega$ on the plots and to carry out the computations automatically. Once the apparatus has been calibrated, the only raw data read is the setting of knob 22 and the frequency scale marks on the plots. Thus, a relatively complete description of a system can be obtained without reading large quantities of data, and the data that is needed is obtained relatively easily and can be processed without great effort on the part of engineers.

In summary, method and apparatus have been disclosed for determining an undamped value of mobility from testing carried out on a damped structural specimen. With an undamped acceleration mobility value, it is possible to determine the modal accelerations which provide a measure of the significant vibratory modes of the structure.

While the present invention has been described in a preferred embodiment, it should be understood that numerous modifications and substitutions can be made to the disclosed apparatus and method without departing from the spirit of the invention. For example, accelerometers have been disclosed for measuring the response of the damped helicopter frame since such instruments are readily available and provide a direct measure of acceleration to determine acceleration mobilities and modal accelerations. It is also possible, however, to obtain acceleration signals from displacement transducers by twice differentiating the displacement signal. The vibrator 12 provides one means for exciting the airframe to obtain the acceleration response over a selected range of forcing frequencies; however, it is also contemplated that the same information can be obtained by a Fourier analysis of the accelerometer responses when the airframe is struck with a hammer instrumented to give a signal proportional to the striking force or vibrated with a random noise generator to excite the many different vibratory modes. Accordingly, the present invention has been described in a preferred embodiment by way of illustration rather than limitation.

I claim:

1. A method of determining an undamped physical response characteristic from a damped specimen comprising:
    exciting the damped specimen to produce physical responses over a range of forcing frequencies of interest;
    producing two signals representing respectively the excitation and the corresponding physical responses produced;
    combining with one of the produced signals a signal proportional to the other of the produced signals by a known constant of proportionality to thereby produce a third signal;
    dividing the third signal into said other of the signals to obtain a fourth signal representative of a modified response characteristic of the damped specimen over the range of forcing frequencies of interest;
    determining the frequencies at which the modified response characteristic indicates a resonant condition; and
    determining from the known constant of proportionality an undamped value of the response characteristic at the frequencies indicating the resonant condition.

2. A method of determining an undamped mobility as defined in claim 1 wherein:
    the step of combining comprises multiplying the response signal by a known constant or proportionality and adding the resulting proportioned response signal to the excitation signal:
    the step of dividing comprises obtaining a fourth signal representative of a modified mobility of the damped specimen; and
    the step of determining an undamped mobility value comprises equating the undamped mobility value to the reciprocal of the known constant of proportionality.

3. A method of determining an undamped mobility as defined in claim 1 wherein:
    the step of combining comprises multiplying the excitation signal with a known constant of proportionality and adding the proportional signal to the response signal;
    the step of dividing comprises obtaining a fourth signal representative of a modified impedance of the damped specimen over a range of forcing frequencies of interest; and
    step of determining the undamped mobility comprises equating the undamped mobility value to the known constant of proportionality.

4. A method of determining an undamped mobility from a structural specimen having damping comprising the steps of:
    exciting the specimen having damping with a force at a plurality of forcing frequencies;
    measuring the force which excites the damped specimen and producing a corresponding force signal;
    measuring at a given point on the specimen the response of the specimen produced by the measured force during the step of exciting and producing a related response signal;
    adding to the measured force signal a signal representing an artificial force proportional to the response signal and of selected value to produce a modified force signal;
    determining a modified mobility of the specimen from the modified force signal and the response signal; and
    determining resonant frequencies from the modified mobility whereby the reciprocal of the constant of proportionality of selected value equals an undamped mobility of the specimen at the forcing frequency equal to the resonant frequencies of the modified mobility.

5. A method of determining an undamped mobility as in claim 4 wherein:
    the step of measuring and producing a response signal comprises producing an acceleration signal representing the acceleration of the given point on the damped structural specimen; and
    the step of adding comprises adding a signal representing an artificial inertial force having the acceleration of the given point on the specimen and a mass of selected value.

6. A method of determining an undamped mobility as in claim 5 wherein the step of measuring and producing a response signal comprises measuring the acceleration at the given point of the specimen with an accelerometer, and producing a corresponding acceleration signal.

7. A method of determining an undamped mobility as defined in claim 4 wherein the step of determining an undamped resonant frequency includes calculating the resonant frequency from the expression $$\Omega_i^2 = \frac{2p_{1_i}^2}{\frac{p_{1_i}^2}{p_{2_i}^2} + 1}$$

where $\Omega_i$ is the resonant frequency and $p_{1_i}$ and $p_{2_i}$ are frequencies at adjacent maximum and minimum peaks at the $i$-th mode in the modified mobility curve.

8. A method of determining an undamped mobility as in claim 4 including the step of:
   plotting the modified mobility determined from the modified force signal and the response signal; and wherein
   the step of determining the undamped resonant frequency comprises determining the undamped resonant frequency from the plotted mobility.

9. A method of determining an undamped mobility as defined in claim 4 wherein the step of adding comprises adding to the measured force signal a signal representing an artificial force produced by a physical impedance.

10. A method of determining an undamped mobility as defined in claim 9 wherein the physical impedance is a mass.

11. A method of determining an undamped mobility value from a damped specimen comprising:
   exciting the damped specimen to produce physical responses over a range of forcing frequencies of interest;
   producing two signals presenting respectively the excitation and the corresponding physical responses produced;
   combining with the excitation signal a signal proportional to the response signal by a known constant of proportionality to produce a modified force signal;
   dividing the modified force signal into the response signal to obtain a signal representative of a modified mobility of the specimen over the range of forcing frequencies of interest;
   determining the frequencies at which the modified mobility indicates a resonant condition; and
   determining an undamped mobility value of the specimen from the reciprocal of the known constant proportionality.

12. A method of determining an undamped mobility as defined in claim 11 wherein the step of determining the frequencies at which a resonant condition of the modified mobility is indicated comprises plotting the modified mobility response and obtaining the determined frequencies from the plotted response.

13. A method of determining the modal accelerations of a damped structure for a response at a first point on the structure ($j$) due to a force at a second point ($k$) on the structure comprising:
   producing a force on the structure at the second point to obtain a corresponding response having a vibratory component at the first point;
   determining the actual damped mobility of the damped structure from the force at the second point and the response at the first point;
   determining a modified damped mobility representing the mobility of the damped structure modified to include a known artificial impedance affecting only the response at the first point of the structure due to the force at the second point;
   determining the undamped resonant frequencies of the structure with and without the artificial impedance from the actual and modified damped mobilities; and
   calculating the modal acceleration utilizing the determined undamped resonant frequencies and the value of the known artificial impedance.

14. A method of determining the modal accelerations of a damped structure as defined in claim 13 wherein
   the steps of determining the actual and modified damped mobilities include measuring the vibratory force and the vibratory response to produce force and response signals; and
   the step of determining the modified damped mobility additionally includes combining the measured force signal with another force signal having the response of the structure at the first point and a constant of proportionality equal to the value of the known artificial impedance.

15. A method of determining the modal accelerations of a damped structure as in claim 14 wherein the step of determining a modified damped mobility comprises measuring the acceleration response of the structure at the first point and multiplying the response by a constant of proportionality representative of a known artificial mass.

16. The method of determining modal accelerations as in claim 13 wherein the steps of determining the actual and modified mobility comprise determining actual and modified acceleration mobilities.

17. The method of determining modal accelerations of a damped structure as in claim 13 wherein the steps of determining the actual and damped mobilities include the mobilites for which the forcing point ($k$) and response point ($j$) are the same.

18. A method of determining the modal accelerations of a damped structural specimen comprising:
   shaking the structural specimen over a given range of forcing frequencies with known vibratory forces;
   plotting an actual mobility curve for the damped structural specimen from the known vibratory forces and specimen response data measured during the step of shaking;
   also plotting a modified mobility curve for the specimen from measured specimen response data and the known vibratory forces combined with artificial forces representing forces producing the same response as the structural specimen from an hypothetical impedance of known value;
   determining the natural frequencies of the specimen indicated in both the actual and modified mobility curves;
   determining an undamped mobility value of the structural specimen from the hypothetical impedance of known value; and
   calculating the modal accelerations utilizing the determined natural frequencies and undamped mobility value.

19. A method of determining the modal accelerations as defined in claim 18 wherein the step of plotting a modified curve includes generating a signal representative of the artificial forces from the specimen response data measured during the step of shaking.

20. A method of determining the modal accelerations as defined in claim 19 wherein:
   the step of generating the artificial force signal comprises amplifying a signal manifesting a measured vibratory response of the specimen with a selected amplification factor representing the hypothetical impedance of known value.

21. A method of determining a modal acceleration as in claim 20 wherein the step of generating comprises amplifying an acceleration signal derived from the specimen during the step of shaking with an amplification factor representing an hypothetical mass of known value to produce a signal representing an artificial inertial force.

22. A method as defined in claim 21 wherein the step of plotting further comprises adding the signal representing the artificial inertial force to a signal representing the known vibratory forces shaking the specimen.

23. A method of determining the modal accelerations as defined in claim 18 wherein the step of determining the undamped mobility value comprises calculating the inverse of the hypothetical impedance of known value.

24. A method of determining the modal accelerations as in claim 18 wherein the step of determining the natural frequencies comprises calculating the natural frequencies ($\Omega_i$) from the expression $$\Omega_i^2 = \frac{2p_{1_i}^2}{\frac{p_{1_i}^2}{p_{2_i}^2} + 1}$$

wherein $p_{1_i}$ and $p_{2_i}$ represent the peak frequencies in the $i$-th mode of a mobility curve.

25. A method of determining the modal accelerations as defined in claim 18 wherein the step of calculating the modal accelerations utilizes the expression $$\ddot{Y}_{jk} = E_{jk} - \sum_{i=x+1}^{n} A_{jk_i} \frac{\omega^2/\Omega_i^2}{(1 - \omega^2/\Omega_i^2)}$$

wherein the value of the undamped mobility $\ddot{Y}_{jk}$ is the reciprocal of the hypothetical impedance of known value, $E_{jk}$ is the rigid-body acceleration coefficient, $A_{jk_i}$ is the $i$-th modal acceleration, $\Omega_i$ is the natural frequency of the specimen in the $i$-th mode from the actual mobility curve and $\omega$ is one of the natural frequencies determined from the modified mobility curve.

26. A method of determining the modal accelerations as in claim 18 wherein:
the step of plotting a modified mobility curve for the specimen is performed twice with different hypothetical impedances of known values; and
the step of calculating comprises calculating the modal accelerations from a number of simultaneous linear equations each of which is equal to the difference of the hypothetical impedances of known value.

27. Apparatus providing information from a damped specimen for determining an undamped mobility value comprising:
means for exciting the damped specimen to produce physical responses over a range of forcing frequencies of interest;
means for producing signals manifesting the excitation and corresponding responses produced by the means for exciting;
means for combining with one of the produced signals a signal proportional to the other of the produced signals by a known constant of proportionality to thereby generate a third signal; and
means for dividing the third signal into said other of the signals to obtain a fourth signal representative of a modified response characteristic of the damped specimen.

28. Apparatus for determining an undamped mobility as defined in claim 27 wherein:
the means for combining comprises a linear amplifier receiving said one of the produced signals and producing a proportional output signal, and a differential amplifier receiving said other of the signals and the proportional output signal from the linear amplifier.

29. Apparatus for determining an undamped mobility as defined in claim 27 wherein:
the means for producing two signals comprises sensors measuring the excitation and response from the specimen and producing excitation and response signals respectively; and
switching means are connected to the sensors and have two outputs between which the sensor signals are interchanged by different switch conditions.

30. Apparatus providing information from a structurally damped specimen for determining an undamped mobility value comprising:
means for exciting the structurally damped specimen over a range of forcing frequencies of interest;
means for measuring the vibratory force which excites the specimen and for producing a corresponding force signal;
means for measuring the vibratory response of the specimen at a given point due to the measured vibratory force and for producing a corresponding response signal;
means for adding to the measured force signal another signal representing an artifical force proportional to the response signal and having a constant of proportionality of selected value to produce a modified mobility curve for the damped specimen from the modified force signal and the measured response signal.

31. Apparatus for determining an undamped mobility as defined in claim 30 wherein the means for exciting comprises means for vibrating the specimen over a range of forcing frequencies of interest.

32. Apparatus for determining an undamped mobility as defined in claim 30 wherein the means for measuring the vibratory response of the specimen is an accelerometer producing a signal corresponding to the vibratory response at the given point on the damped specimen.

33. Apparatus for determining an undamped mobility as defined in claim 32 wherein the means for adding comprises an amplifier receiving the acceleration signal and having a known, variable gain permitting the acceleration signal to be amplified by a selected amount to represent an artificial inertial force signal proportional to the acceleration signal and having a mass factor determined by the gain factor of the amplifier.

34. Apparatus as defined in claim 33 wherein the amplifier has a calibrated gain adjustment for determining the mass factor in the artificial inertial force.

* * * * *

UNITED STATES PATENT OFFICE
CERTIFICATE OF CORRECTION

Patent No. 4,031,744  Dated June 28, 1977

Inventor(s) William G. Flannelly

It is certified that error appears in the above-identified patent and that said Letters Patent are hereby corrected as shown below:

Column 2, Line 5, after response "y" should be --$\ddot{y}$--.

Column 2, Equation 3, should be $\{\ddot{y}\} = [\ddot{z}]^{-1} \{f\} \equiv [\ddot{Y}] \{f\}$ Column 2, Line 23, "intance" should be --instance--.

Column 2, Equation 4, should be:
$$\frac{\partial \ddot{y}_j}{\partial f_1} f_1 + \ldots + \frac{\partial \ddot{y}_j}{\partial f_n} f_n = \ddot{y}_j$$

Column 2, Equation 5, should be:
$$\ddot{Y}_{j1} f_1 + \ddot{Y}_{j2} f_2 + \ddot{Y}_{j3} f_3 + \ldots + \ddot{Y}_{jn} f_n = \ddot{y}_j$$

Column 2, Equation 6, should be $\ddot{Y}_{jk} \equiv \partial \ddot{y}_j / \partial f_k$ Column 3, Equation 7, should be
$$A_{jki} = \frac{\phi_{ji} \phi_{ki}}{\{\phi\}_i^T [M] \{\phi\}_i}$$

Column 3, Line 14, "wherein" should be --where--.

Column 4, Line 4, "rigidbody" should be --rigid-body--.

Column 4, Line 19, "ridig" should be --rigid--.

Column 5, Equation 14, should be:
$$\ddot{Y}_{jk} = E_{jk} - \sum_{i=X+1}^{n} A_{jki} \frac{\omega^2 / \Omega_i^2}{(1 - \omega^2 / \Omega_i^2)}$$

UNITED STATES PATENT OFFICE
CERTIFICATE OF CORRECTION

Patent No. 4,031,744   Dated June 28, 1977

Inventor(s)   William G. Flannelly

It is certified that error appears in the above-identified patent and that said Letters Patent are hereby corrected as shown below:

Column 7, Line 36, "only" should be --<u>only</u>--.

Column 10, Line 14, after "$\Delta Z$" insert --of--.

Column 10, Line 58, after (defini)tion, ",," should be --,--.

Column 11, Line 8, "P1i" should be --$P1_i$--.

Column 11, Line 8, "P2i" should be --$P2_i$--.

Column 13, Equation 21 should be:
$$\frac{1}{\dot{Z}_{jk}} = \ddot{Y}_{jk} = -\Delta s$$

Column 14, Line 21 "is $\overline{\overline{\phantom{x}}}$ more" should be --is more--.

Column 14, Line 29, "differnt" should be --different--.

Column 20, Line 26, "determing" should be --determining--.

Signed and Sealed this

Twenty-ninth Day of November 1977

[SEAL]

Attest:

RUTH C. MASON  
*Attesting Officer*

LUTRELLE F. PARKER  
*Acting Commissioner of Patents and Trademarks*